(12) United States Patent
Ripper et al.

(10) Patent No.: US 12,388,217 B2
(45) Date of Patent: Aug. 12, 2025

(54) COMPONENT FOR ATTACHING A CABLE TO A HOUSING MEMBER

(71) Applicants: TE Connectivity India Private Limited, Bangalore (IN); TE Connectivity Germany GmbH, Bensheim (DE)

(72) Inventors: Hartmut Ripper, Bensheim (DE); Yehya Ashour, Bensheim (DE); Vinoth Kumar S, Bangalore (IN)

(73) Assignees: TE Connectivity India Private Limited, Bangalore (IN); TE Connectivity Germany GmbH, Bensheim (DE)

( * ) Notice: Subject to any disclaimer, the term of this patent is extended or adjusted under 35 U.S.C. 154(b) by 775 days.

(21) Appl. No.: 17/692,720

(22) Filed: Mar. 11, 2022

(65) Prior Publication Data

US 2022/0294155 A1    Sep. 15, 2022

(30) Foreign Application Priority Data

Mar. 11, 2021  (DE) .......................... 102021105894.5

(51) Int. Cl.
*H01R 13/502*   (2006.01)
*H01R 13/58*    (2006.01)

(52) U.S. Cl.
CPC ....... *H01R 13/5812* (2013.01); *H01R 13/502* (2013.01); *H01R 13/5808* (2013.01); *H01R 13/5825* (2013.01)

(58) Field of Classification Search
None
See application file for complete search history.

(56) References Cited

U.S. PATENT DOCUMENTS

| | | | |
|---|---|---|---|
| 3,800,064 A | 3/1974 | Lusk | |
| 4,440,425 A | 4/1984 | Pate et al. | |
| 4,632,489 A | 12/1986 | Skinner | |
| 6,116,945 A * | 9/2000 | Davis ................. | H01R 13/5825 439/598 |
| 6,478,609 B1 | 11/2002 | Davis et al. | |
| 6,479,754 B1 | 11/2002 | Muzslay | |
| 6,948,970 B2 | 9/2005 | Hayashi et al. | |

(Continued)

FOREIGN PATENT DOCUMENTS

| | | | | |
|---|---|---|---|---|
| CN | 110504587 A | * | 11/2019 | ........... H01R 13/502 |
| DE | 2348895 A1 | | 4/1974 | |

(Continued)

OTHER PUBLICATIONS

German Office Action, App No. 10 2021 105 894.5, dated Nov. 16, 2021, 7 pages.

(Continued)

*Primary Examiner* — Tho D Ta

(74) *Attorney, Agent, or Firm* — Barley Snyder

(57) ABSTRACT

A component for attaching a cable to a housing member includes an attachment section having an attachment element and a cable clamping section integrally connected to the attachment section. The cable clamping section has a tubular shape and forms a cable tunnel. The cable clamping section has a clamping tongue that is deflectable into the cable tunnel.

20 Claims, 10 Drawing Sheets

(56) References Cited

U.S. PATENT DOCUMENTS

| | | | |
|---|---|---|---|
| 7,938,674 B2 * | 5/2011 | Lindkamp | H01R 13/59 439/461 |
| 9,472,890 B2 | 10/2016 | Arai et al. | |
| 10,211,565 B2 | 2/2019 | Trimborn | |
| 2014/0318860 A1 | 10/2014 | Kuji et al. | |

FOREIGN PATENT DOCUMENTS

| | | | | |
|---|---|---|---|---|
| DE | 35 09 397 | A1 | | 9/1986 |
| DE | 3826474 | A1 | | 2/1990 |
| DE | 100 52 556 | A1 | | 4/2002 |
| DE | 10 2006 003 616 | A1 | | 8/2006 |
| DE | 10 2005 057 266 | A1 | | 6/2007 |
| DE | 60 2004 004 712 | T2 | | 10/2007 |
| DE | 10 2009 053 364 | B3 | | 1/2011 |
| DE | 202015103733 | U1 * | 10/2015 | H01R 13/5812 |
| DE | 10 2015 112 385 | A1 | | 4/2016 |
| DE | 202016100256 | U1 | | 7/2016 |
| DE | 202016103470 | U1 * | | 9/2016 |
| DE | 202017006800 | U1 * | | 7/2018 |
| EP | 2202852 | A2 | | 6/2010 |
| IT | 102019000021195 | A1 | | 2/2020 |
| JP | S547063 | B2 | | 4/1979 |
| JP | 2010153268 | A | | 7/2010 |
| JP | 201885230 | A | | 5/2018 |
| WO | 2018068826 | A1 | | 4/2018 |
| WO | 2021095068 | A1 | | 5/2021 |

OTHER PUBLICATIONS

Chinese Second Office Action dated Mar. 4, 2024 with English translation, corresponding to Application No. 202210222716.0, 17 pages.
European Patent Office Office Action dated Oct. 28, 2024, corresponding to Application No. 22 161 451.4-1201, 6 pages.
Office Action from the Japanese Patent Office dated Feb. 21, 2023 (together with English translation thereof), corresponding to Application No. 2022-035114, 11 pages.
India Office Action, Application No. 202244012466, Dated: Sep. 9, 2022, 6 pages.
Extended European Search Report, Application No. 22161451.4-1201, Dated: Aug. 2, 2022, 8 pages.

* cited by examiner

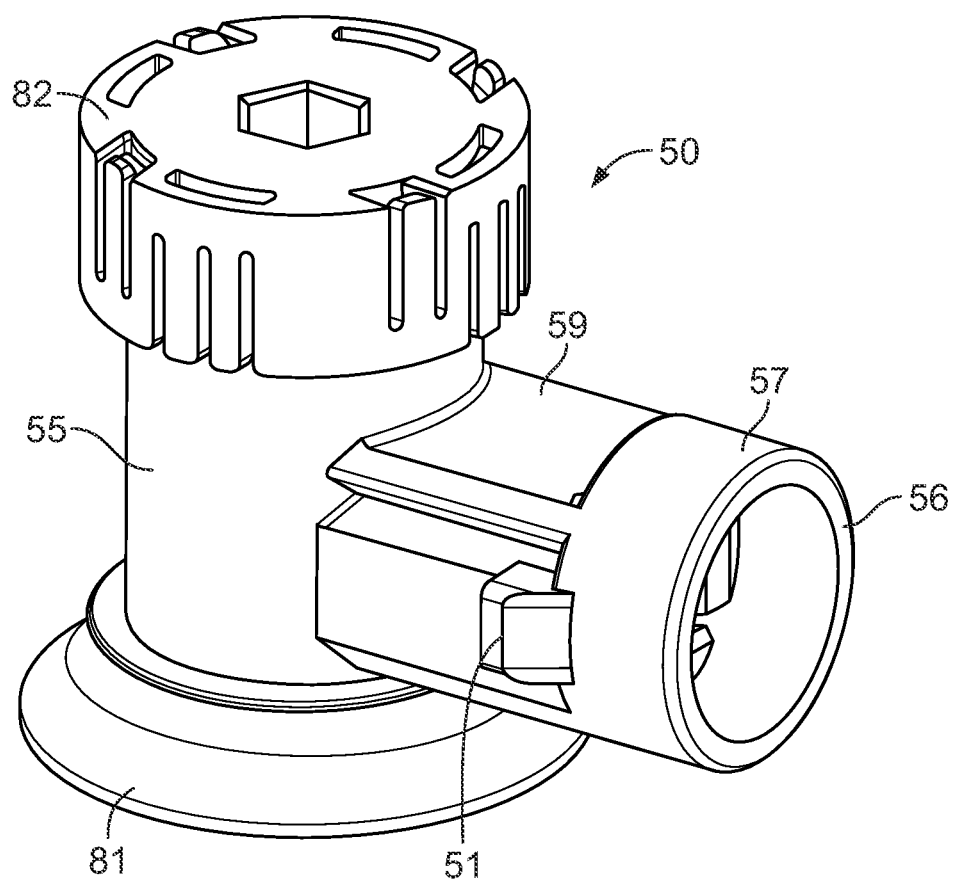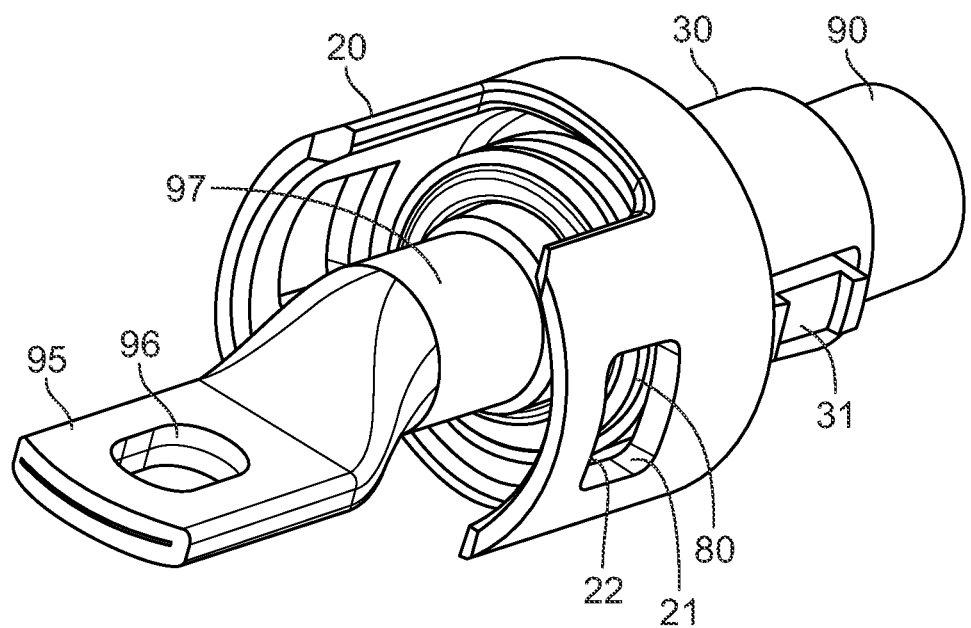
FIG. 4

COMPONENT FOR ATTACHING A CABLE TO A HOUSING MEMBER

CROSS-REFERENCE TO RELATED APPLICATIONS

This application claims the benefit of the filing date under 35 U.S.C. § 119(a)-(d) of German Patent Application No. 102021105894.5, filed on Mar. 11, 2021.

FIELD OF THE INVENTION

The present invention relates to a component for attaching a cable to a housing member.

BACKGROUND

A housing member and a component may be parts of a housing assembly which may be used to attach a cable to an external element, for example, to a ground connection. Such systems are used, for example, in automobiles. Previous systems, however, are difficult to assemble, are prone to assembly errors, and can be unsafe.

SUMMARY

A component for attaching a cable to a housing member includes an attachment section having an attachment element and a cable clamping section integrally connected to the attachment section. The cable clamping section has a tubular shape and forms a cable tunnel. The cable clamping section has a clamping tongue that is deflectable into the cable tunnel.

BRIEF DESCRIPTION OF THE DRAWINGS

The invention will now be described by way of example with reference to the accompanying Figures, of which:

FIG. 4 is a perspective view of a housing member and the component connected to the further elements;

DETAILED DESCRIPTION OF THE EMBODIMENT(S)

Figure 1:
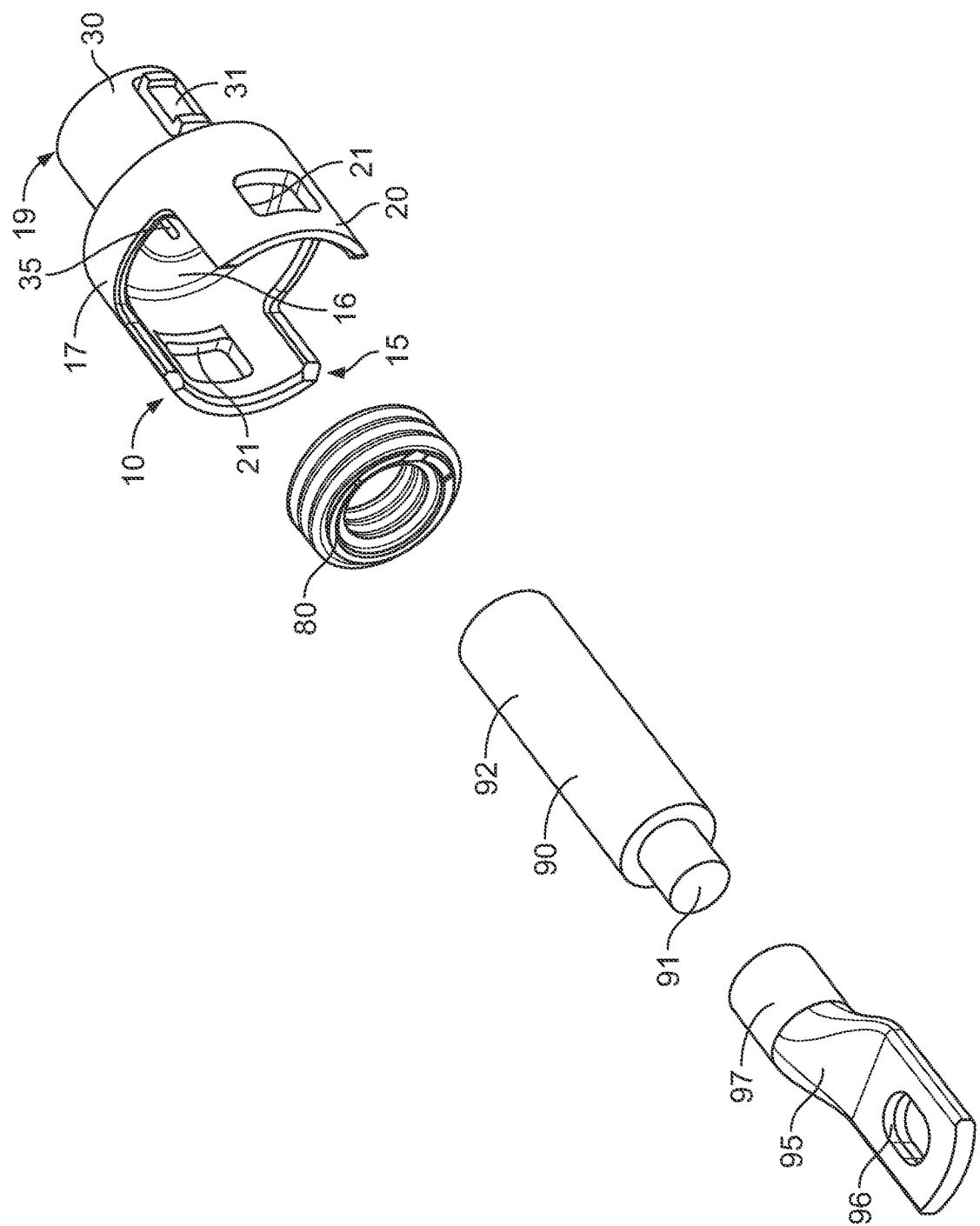
FIG. 1 is an exploded perspective view of a component according to an embodiment with further elements.

The invention shall be explained in more detail hereafter by way of exemplary embodiments with reference to the drawings. The developments and configurations shown are each independent of one another and may be combined with one another at random, depending on necessity for the application.

A component 10 for attaching a cable 90 to a housing member 50 is shown in the figures. Component 10 comprises an attachment section 20 with several attachment elements 21 and a tubular cable clamping section 30 that is connected integrally to attachment section 20 and that forms a cable tunnel 35. Cable tunnel 35 forms a substantially circular-cylindrical receptacle for cable 90, shown in FIG. 1, which has a circular-cylindrical configuration. The size and the shape of cable tunnel 35 are matched to the size and the shape of cable 90 so that cable tunnel 35 guides cable 90 and holds it in a stable manner. Cable 90 may be standardized, in particular according to national or international standards or according to company-specific or proprietary standards.

Cable 90 may be, for example, a ground connection with which a device is connected to a ground potential or an earth potential. Cable 90 then typically comprises a single inner conductor 91 and a sheath 92 that surrounds conductor 91, as shown in FIG. 1, and is made of insulating material, for example, elastic or plastic material.

A cable lug 95 shown in FIG. 1 may be attached to one end of cable 90, for example, by crimping cable lug 95 onto a crimping section 97 on an exposed part of conductor 91. Cable lug 90 further comprises an opening 96 into which a pin 70, shown in FIG. 5, may be inserted. Pin 70 may have at a ground potential or an earth potential applied.

Figure 5:
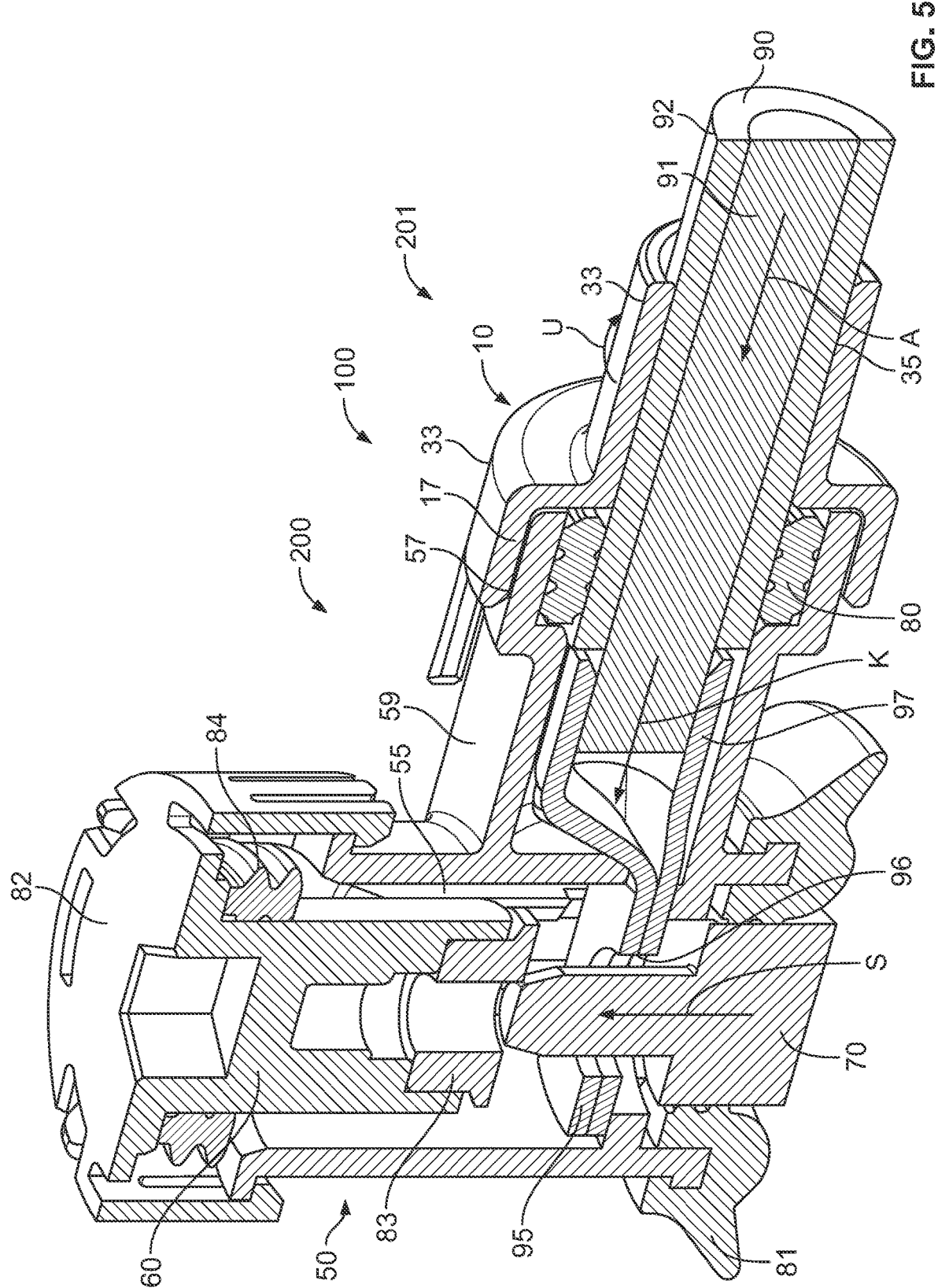
FIG. 5 is a sectional perspective view of a connection assembly in an adjustment state.
Figure 6:
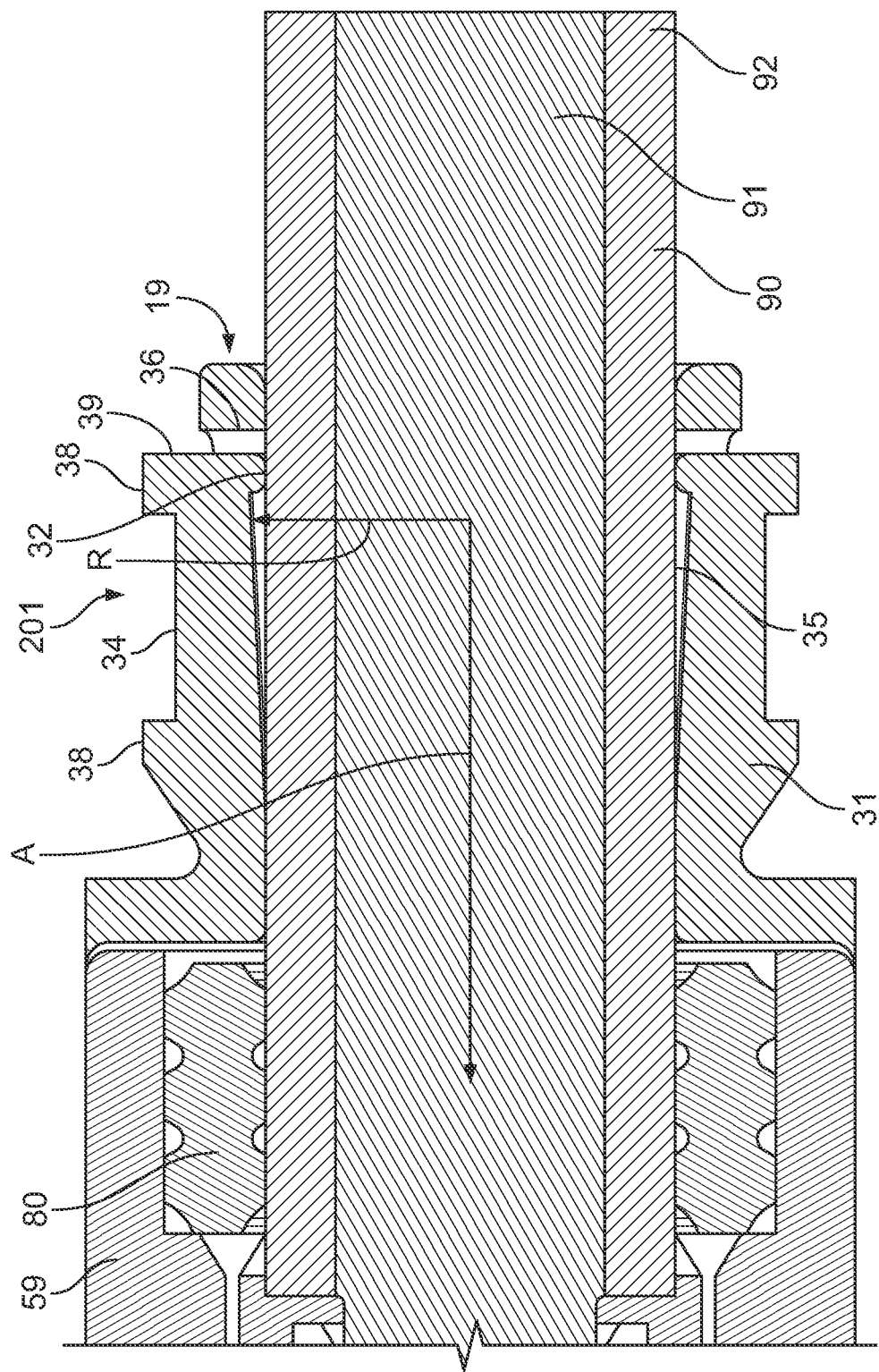
FIG. 6 is a sectional side view of a detail of the connection assembly.
Figure 7:
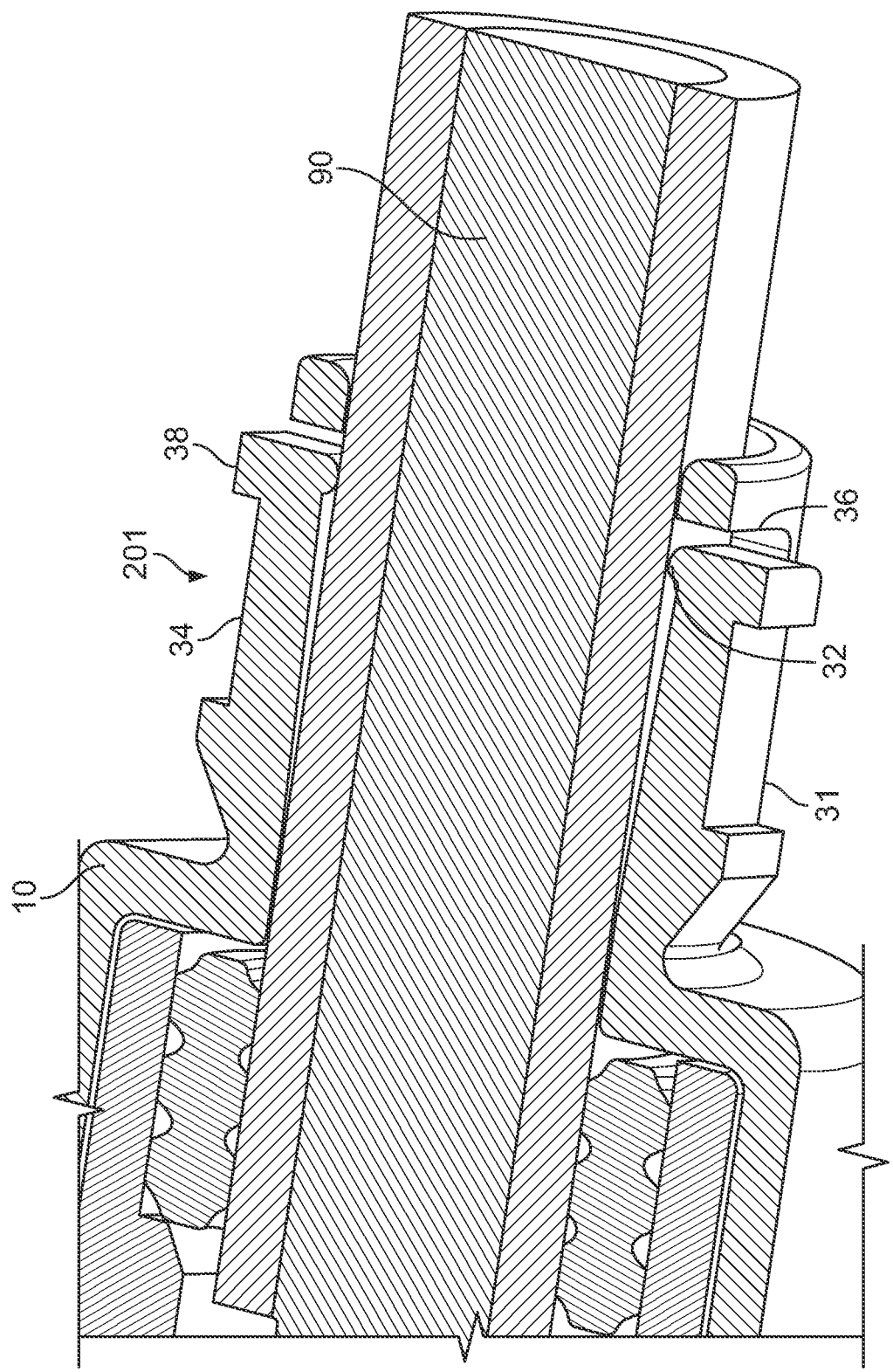
FIG. 7 is a sectional perspective view of the detail of the connection assembly.

In adjustment position 201 shown in FIGS. 5, 6 and 7, cable 90 may be displaced and thereby adjusted relative to the remainder of connection assembly 200 in a cable receptacle 59 along a cable receiving direction K which runs parallel to an axial direction of cable tunnel 35. The connection assembly 200 includes a housing assembly 100 described below and the cable 90 with the able lug 95 arranged in the housing assembly 100. In particular, the position of opening 96 may be adjusted. Once cable 90 with cable lug 95 has been inserted into a chamber 55 of a housing assembly 100, as shown in FIG. 5, the pin 70 in the form of a dummy pin has been inserted into opening 96 along a pin receiving direction S. The housing assembly 100 includes the component 10 and a housing member 50 described in greater detail below.

Figure 2:
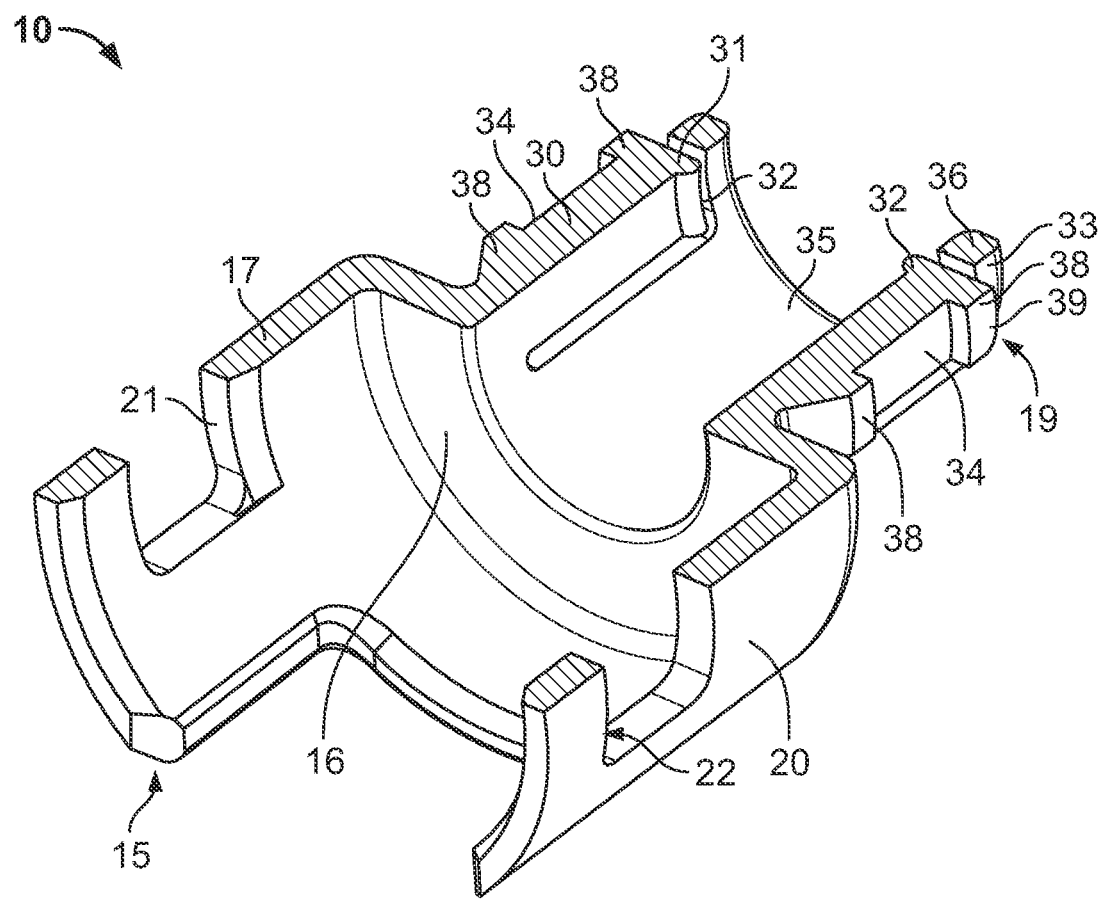
FIG. 2 is a sectional perspective view of the component.
Figure 3:
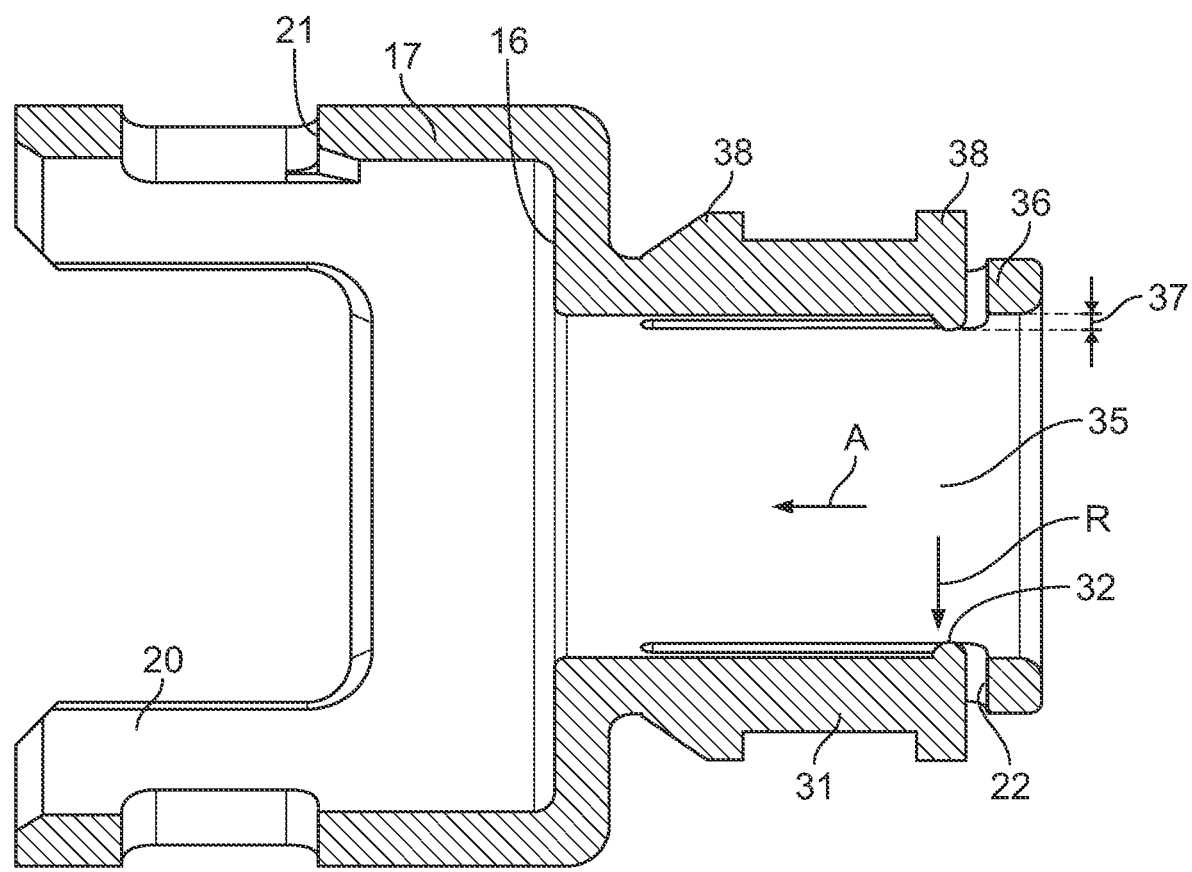
FIG. 3 is a sectional side view of the component.

For attaching cable 90 in component 10 and affixing the position, cable clamping section 30 comprises at least one clamping tongue 31 which may be deflected into cable tunnel 35, as shown in FIGS. 2 and 3. In the example shown, there are two oppositely disposed clamping tongues 31 in order to achieve a good distribution of forces and a good clamping effect. Clamping tongues 31 may there be deflected in and opposite to a radial direction R which runs perpendicular to axial direction A. In another embodiment, there also may be more than two clamping tongues 31 present distributed uniformly along the circumference of the clamping section 30.

Each of clamping tongues 31 comprises an inwardly directed clamping projection 32 as shown in FIGS. 2 and 3 that, when clamping tongue 31 is manipulated, presses or digs into sheath 92 of cable 90, as shown in FIG. 6, and thereby prevents any movement of cable 90. The sheath 92 is not destroyed by the clamping tongue 31, but merely plastically deformed. A narrow configuration of the clamping projection 32, for example, as a pin or strip, enables good plastic deformation of the cable sheath 92 with low forces at the same time. The clamping projection 32 may project into the cable tunnel 35. In an embodiment, the clamping projection 32 is at a free end of the clamping tongue 31.

Figure 8:
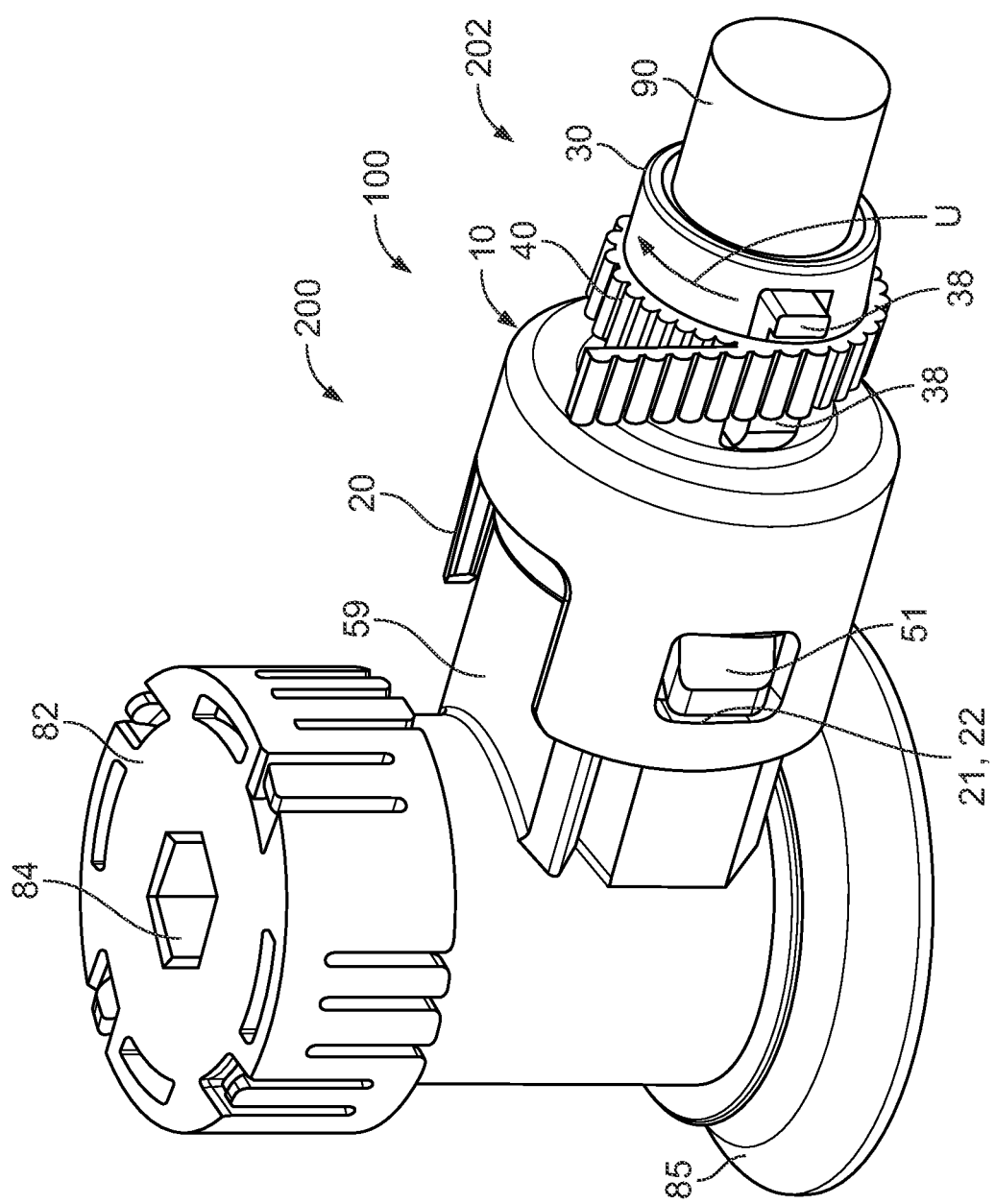
FIG. 8 is a perspective view of the connection assembly in a clamping state.
Figure 9:
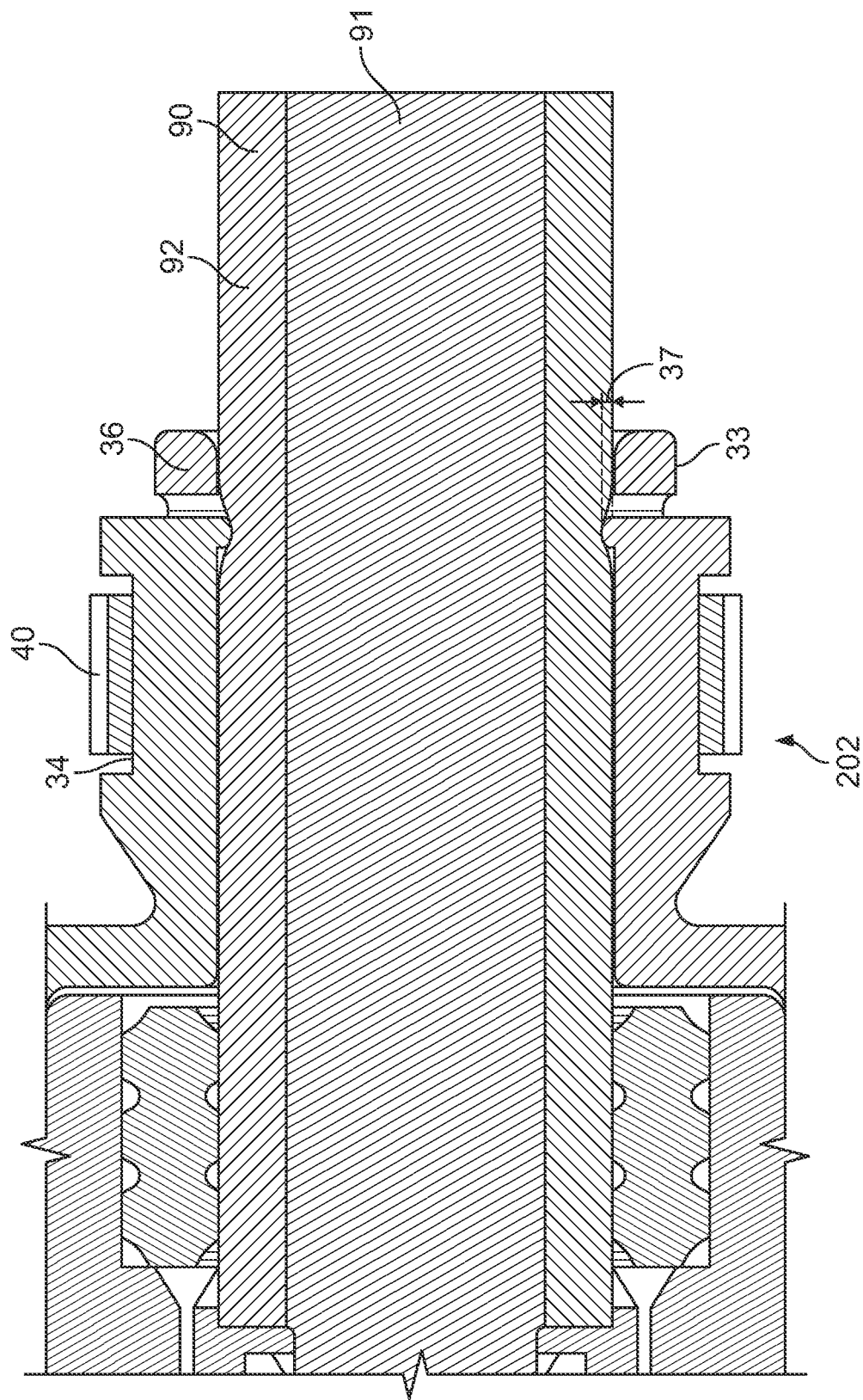
FIG. 9 is a sectional side view of a detail of the connection assembly in the clamping state.
Figure 10:
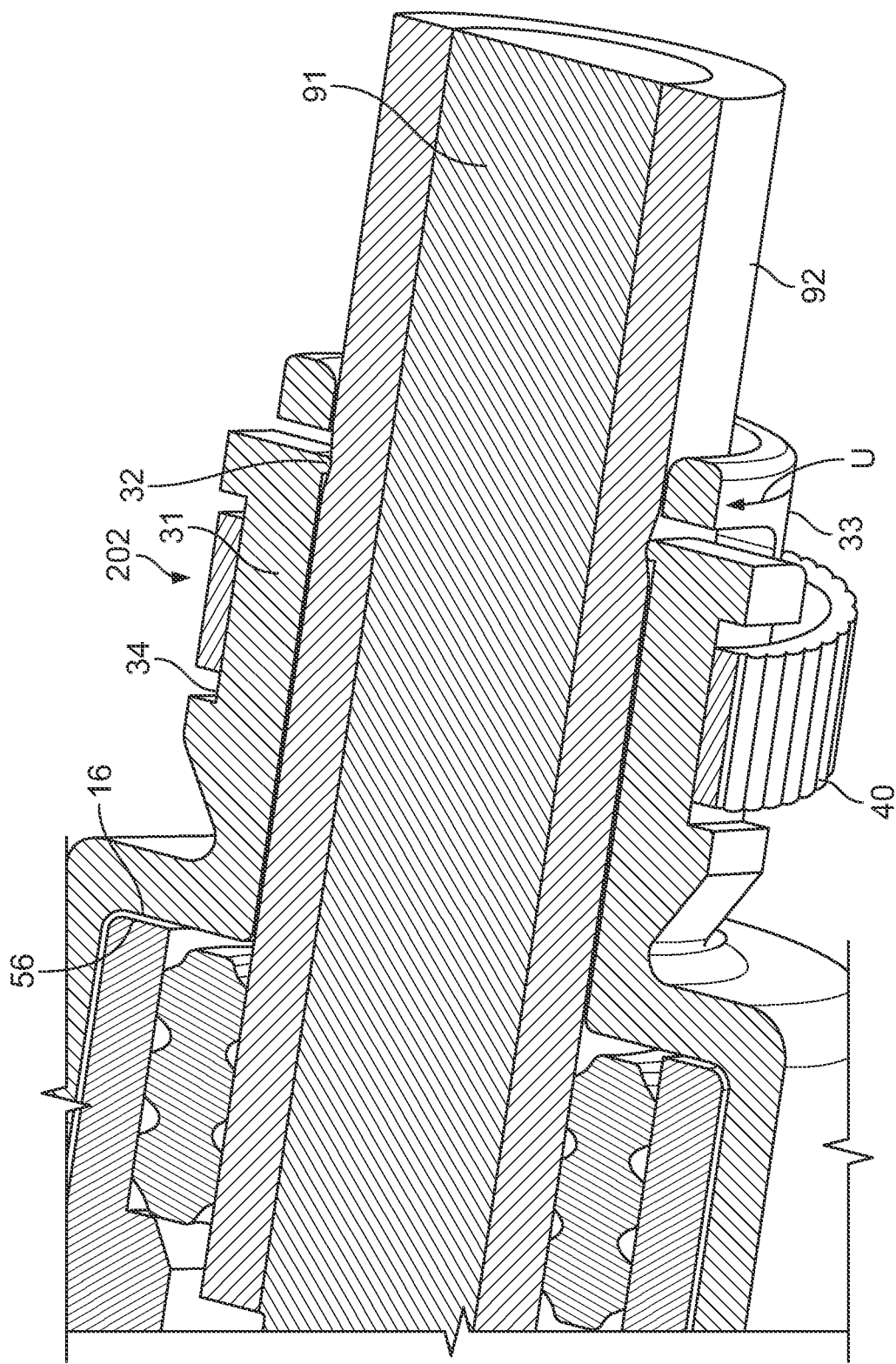
FIG. 10 is a sectional perspective view of the detail of the connection assembly in the clamping state.

By manipulating clamping tongue 31, connection assembly 200 then transitions to a clamping state 202 which is shown, for example, in FIGS. 8, 9 and 10. In clamping state 202, the position of clamping tongue 31 is affixed by a strap-shaped or a belt-shaped clamping element 40, presently in the form of a cable tie. A cable tie is presently to mean in particular an element with a belt-shaped toothed section and a head connected thereto in which the belt-shaped section may be affixed in a ratchet-like manner. The fixation may be repeatedly releasable or not be non-destructively releasable.

In order to lock clamping element 40 against displacement along axial direction A, each clamping tongue 31 on an outer side comprises a guide groove 34, shown in FIGS. 2, 6, and 7, extending along a circumferential direction U of cable clamping section 30. Guide grooves 34 are each defined on both sides by outwardly projecting guide strips 38 running along circumferential direction U.

For simple manipulation, each clamping tongue 31 may be manipulated from the exterior. The clamping tongue 31 may project at least in sections from an outer wall of the cable clamping section 30. This may be the case in particular in an adjustment state or a resting state, where the resting state may be a forceless state in which no forces act upon the clamping tongue 31. The clamping tongue 31 may not project into the cable tunnel 35 in the resting state. An adjustment state may be a state in which the clamping element 40 does not yet clamp the clamping tongue 31 sufficiently and an adjustment of the cable 90 is then still possible.

In order to prevent clamping projection 32 from penetrating too deeply into cable sheath 92 and damaging it, a radial cross section of cable clamping section 30 in the region of clamping tongue 31 is configured such that clamping tongue 31 deflects inwardly at most by a predefined value when clamping element 40 is attached. In the embodiment shown, this is achieved in that clamping tongue 31 is deflected inwardly at most by a predefined value when it forms a circular outer circumference with the remainder of cable clamping section 30. When using a strap-shaped or belt-shaped clamping element 40, it may then simply be lashed down until it is in complete abutment. The clamping tongue 31 or the clamping projection 32 may then automatically be deflected to the maximum degree.

As a result, depth 37, shown for example in FIG. 9, to which clamping projection 32 penetrates into cable sheath 92 is effectively limited. When the strap-shaped clamping element 40 is attached and lashed to the maximum degree, it then runs in a circle along the outer circumference. This may prevent damage to the cable sheath 92 or excessive clamping force. The predefined value may correspond to a degree of the projection or be in a defined relationship therewith. For example, it may correspond to a degree of the projection in the region of a guide strip 38 minus the height of the guide strip 38 in relation to a base of the guide groove 34.

Clamping projections 32 are each beveled along axial direction A, as shown in FIG. 2, in order to facilitate the insertion and displacement of cable 90; the clamping tongue 31 may automatically deflect when the cable 90 is inserted. Clamping projections 32 are configured as tapering strips with an edge oriented towards cable 90.

Around each of clamping tongues 31, cable clamping section 30 has a breakthrough 36 which frames clamping tongue 31, as shown in FIGS. 2 and 3. This stabilizes cable clamping section 30 and clamping tongue 31 and may limit the maximum clamping force. Clamping tongues 31 each extend approximately parallel to an axial direction A and may be deflected perpendicular thereto along radial direction R. The axial direction A may be a direction along which the cable tunnel 35 extends through the clamping section 30.

For a good retaining effect, clamping tongues 31 are each oriented with a free end 39 towards an end 19 of component 10 on the cable side, as shown in FIG. 5.

As shown in FIGS. 1, 2, and 3, attachment elements 21 on component 10 are each shaped as a latching element. They are configured as latching tabs 22 or latching hooks which interact with attachment elements 51 configured as latching projections on housing member 50, shown in FIG. 4. The attachment elements 21, 51 are complementary to one another. The attachment elements 21, 51, may also be configured differently, for example, as a screw and a corresponding hole.

In the latched state, an inner stop surface 16, which is arranged on component 10 and extends perpendicular to axial direction A, abuts against a counter-stop surface 56 on housing member 50. For correct positioning along radial direction R, component 10 and housing member 50 each comprise approximately circular ring-shaped positioning sections 17 and 57 which are complementary to one another. The positioning sections 17, 57 may be configured in particular in an annular, cylindrical, and/or rotationally symmetrical manner.

As shown in FIG. 4, housing member 50 comprises a chamber 55 and a cable receptacle 59 connected to said chamber 55. Chamber 55 receives pin 70 and cable lug 90 and is open along pin receiving direction S, as shown in FIG. 5. Open presently means in particular in the non-assembled state when the openings are not yet closed by other components. It has a substantially cylindrical interior. The vertical arrangement facilitates in particular an adjustment of the cable 90 relative to a pin 70 which is inserted into the chamber 55, for example in the pin receiving direction S. Cable receptacle 59 is configured for being connected to component 10 and is open along cable receiving direction K perpendicular to pin receiving direction S. Cable receptacle 59 is formed integrally with chamber 55. Housing member 50 is, for example, injection-molded from a plastic material.

The attachment section 20 allows for reliable attachment to the housing member 50. The cable 90 may be guided in the cable tunnel 35, where the cable 90 may be movable when the clamping tongue 31 is not deflected into the cable tunnel 35. This allows for the cable 90 and the connection to be adjusted.

With the aid of the solution shown, it is possible to adjust and affix connection assembly 200 prior to the actual assembly such that only one pin 70 later needs to be inserted along pin receiving direction S and connection assembly 200 needs to be attached. This is achieved in particular in that the position of opening 96 is adjusted with a dummy pin prior to the actual assembly and cable 90 is thereafter affixed. After this adjustment and the removal of the dummy pin, opening 96 of cable lug 95 is centered in chamber 55 and cable 90 is clamped by way of clamping tongue 31 deflected into the cable tunnel 35. Due to such pre-adjustment and pre-assembly when connection assembly 200 is established, the final assembly, which may take place later at a different location, is very simple and reliable.

Cable lug 95 is then pressed onto pin 70 by a press-on member 60 which comprises a nut 83 and a manipulation section 82 connected thereto, shown in FIG. 5. For this purpose, pin 70 may have an external thread which is compatible with an internal thread of nut 83. Manipulation section 82 may have a tool interface 84, for example, with a receptacle having a hexagonal cross section, for example, in order to enable manipulation by machine. Manipulation section 82 may consist in particular of an insulating material in order to enable reliable manipulation. Nut 83 may consist of mechanically stable material, for example, metal, and may be embedded in and connected to manipulation section 82 during an injection-molding step.

The connection assembly 200 comprises seals 80, 81, 85, shown in FIGS. 1, 4, and 8, for sealing against dirt and liquids. The seals 80, 81, 85 may be configured such that they only seal when the component 10 is attached or when the press-on member 60 is manipulated.

What is claimed is:

1. A component for attaching a cable to a housing member, comprising:
    an attachment section having an attachment element; and
    a cable clamping section integrally connected to the attachment section, the cable clamping section has a tubular shape and forms a cable tunnel, the cable clamping section has a clamping tongue that is deflectable into the cable tunnel, the clamping tongue is positioned on an outer wall of the cable clamping section and is exposed to an exterior of the component in a direction perpendicular to an axial direction of the cable tunnel.

2. The component of claim 1, wherein the clamping tongue has an inwardly directed clamping projection.

3. The component of claim 1, wherein the clamping tongue has a guide groove on an outer side extending along a circumferential direction of the cable clamping section.

4. The component of claim 1, wherein the clamping tongue is manipulated from the exterior.

5. The component of claim 1, wherein a radial cross-section of the cable clamping section in a region of the clamping tongue is configured such that the clamping tongue deflects inwardly at most by a predefined value when a clamping element is attached.

6. The component of claim 5, wherein the clamping tongue is deflected inwardly at most by the predefined value when it forms a circular outer circumference with a remainder of the cable clamping section.

7. The component of claim 1, wherein the cable clamping section has a breakthrough that frames the clamping tongue.

8. The component of claim 1, wherein the clamping tongue runs parallel to the axial direction.

9. The component of claim 1, wherein a free end of the clamping tongue is oriented toward an end of the component.

10. The component of claim 1, wherein the cable tunnel has a cylindrical cross-section.

11. The component of claim 1, wherein the attachment element is a latching element.

12. The component of claim 1, further comprising an inner stop surface extending perpendicular to the axial direction.

13. A housing assembly, comprising:
    a component including an attachment section having an attachment element and a cable clamping section integrally connected to the attachment section, the cable clamping section has a tubular shape and forms a cable tunnel, the cable clamping section has a clamping tongue that is deflectable into the cable tunnel, the clamping tongue is positioned on an outer wall of the cable clamping section and is exposed to an exterior of the component in a direction perpendicular to an axial direction of the cable tunnel; and
    a housing member having a chamber and a cable receptacle connected to the chamber, the cable receptacle is connected to the component.

14. A connection assembly, comprising:
    a housing assembly including:
        a component including an attachment section having an attachment element and a cable clamping section integrally connected to the attachment section, the cable clamping section has a tubular shape and forms a cable tunnel, the cable clamping section has a clamping tongue that is deflectable into the cable tunnel, the clamping tongue is positioned on an outer wall of the cable clamping section and is exposed to an exterior of the component in a direction perpendicular to an axial direction of the cable tunnel; and
        a housing member having a chamber and a cable receptacle connected to the chamber, the cable receptacle is connected to the component; and
    a cable, an end of the cable having a cable lug is arranged in the housing assembly.

15. The connection assembly of claim 14, wherein the cable lug has an opening centered in the chamber.

16. The connection assembly of claim 14, further comprising a clamping element clamping the cable and deflecting the clamping tongue.

17. The connection assembly of claim 16, wherein the clamping element is separate from the component and extends circumferentially around the cable clamping section.

18. The connection assembly of claim 17, wherein the clamping element is a cable tie that is affixed in a ratchet-like manner.

19. The component of claim 1, wherein the cable clamping section is positioned adjacent to the attachment section and extends from the attachment section along the axial direction.

20. The component of claim 19, wherein the cable clamping section is monolithically formed in a single piece with the attachment section.

* * * * *